United States Patent
Verma et al.

(10) Patent No.: US 11,295,121 B2
(45) Date of Patent: Apr. 5, 2022

(54) CONTEXT-BASED SHAPE EXTRACTION AND INTERPRETATION FROM HAND-DRAWN INK INPUT

(71) Applicant: Microsoft Technology Licensing, LLC, Redmond, WA (US)

(72) Inventors: Arunabh P. Verma, Seattle, WA (US); Sophie A. Beland, Seattle, WA (US); Oluwadara Oke, Seattle, WA (US); William M. Geraci, II, Sammamish, WA (US); Kevin J. Jeyakumar, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/485,216

(22) Filed: Apr. 11, 2017

(65) Prior Publication Data

US 2018/0293214 A1 Oct. 11, 2018

(51) Int. Cl.
*G06F 17/00* (2019.01)
*G06K 9/00* (2022.01)
(Continued)

(52) U.S. Cl.
CPC ..... *G06K 9/00436* (2013.01); *G06F 3/04883* (2013.01); *G06F 40/171* (2020.01);
(Continued)

(58) Field of Classification Search
CPC .. G06F 3/04883; G06F 17/242; G06F 17/278; G06F 17/2765; G06F 17/2785;
(Continued)

(56) References Cited

U.S. PATENT DOCUMENTS 6,137,908 A * 10/2000 Rhee ................. G06K 9/00416
382/187
2006/0085419 A1* 4/2006 Rosen .................... G06Q 30/02
(Continued)

OTHER PUBLICATIONS

Data Community DC, "An Introduction to Named Entity Recognition in Natural Language Processing—Part 1," Apr. 17, 2013, datacommunitydc.org, http://www.datacommunitydc.org/blog/2013/04/a-survey-of-stochastic-and-gazetteer-based-approaches-for-named-entity-recognition (Year: 2013).*

(Continued)

*Primary Examiner* — Andrew T McIntosh

(57) ABSTRACT

The electronic devices described herein are configured to enhance user experience associated with drawing or otherwise inputting shape data into the electronic devices. Shape input data is identified and matched against known shape patterns and, when a match is found, an entity associated with the shape is determined. The entity is converted into an annotation for rendering and/or displaying to the user. The shape identification, entity determination, and annotation conversion may all be based on one or more context elements to increase the accuracy of the shape interpretation. In particular, elements of conversations held via the electronic devices may be used as context for the shape interpretation. Further, machine learning techniques may be applied based on a variety of feedback data to improve the accuracy, speed, and/or performance of the shape interpretation process.

20 Claims, 7 Drawing Sheets

(51) Int. Cl.
*H04W 4/02* (2018.01)
*G06N 20/00* (2019.01)
*G06F 3/04883* (2022.01)
*G06K 9/46* (2006.01)
*G06F 40/171* (2020.01)
*G06N 5/00* (2006.01)
*G06N 20/10* (2019.01)
*G06N 20/20* (2019.01)
*G06N 3/04* (2006.01)

(52) U.S. Cl.
CPC ....... *G06K 9/00429* (2013.01); *G06K 9/4604* (2013.01); *G06N 20/00* (2019.01); *H04W 4/02* (2013.01); *G06N 3/0454* (2013.01); *G06N 5/003* (2013.01); *G06N 20/10* (2019.01); *G06N 20/20* (2019.01)

(58) Field of Classification Search
CPC .......... G06F 40/171; G06K 2009/3291; G06K 2209/01; G06K 9/344; G06K 9/00402; G06K 9/00416; G06K 9/00436; G06K 9/00429; G06K 9/4604; G06N 20/00; G06N 5/003; G06N 20/10; G06N 20/20; G06N 3/0454; H04W 4/02
See application file for complete search history.

(56) References Cited

U.S. PATENT DOCUMENTS

| | | | |
|---|---|---|---|
| 2007/0075989 A1 | 4/2007 | Cohen et al. | |
| 2008/0054072 A1* | 3/2008 | Katragadda | G08G 1/123 235/384 |
| 2008/0222142 A1* | 9/2008 | O'Donnell | G06F 17/30867 |
| 2008/0292190 A1* | 11/2008 | Biswas | G06K 9/00402 382/187 |
| 2009/0002392 A1 | 1/2009 | Hou et al. | |
| 2009/0037822 A1* | 2/2009 | Kandekar | G06Q 10/00 715/733 |
| 2010/0171754 A1* | 7/2010 | Hatfield | G06F 17/242 345/619 |
| 2010/0255865 A1 | 10/2010 | Karmarkar | |
| 2011/0181604 A1 | 7/2011 | Lee et al. | |
| 2013/0174058 A1* | 7/2013 | Kaul | G06F 3/0481 715/753 |
| 2013/0218885 A1* | 8/2013 | Satyanarayanan | G06Q 30/016 707/728 |
| 2013/0257777 A1 | 10/2013 | Benko et al. | |
| 2014/0181741 A1* | 6/2014 | Apacible | G06Q 10/109 715/810 |
| 2015/0002483 A1 | 1/2015 | Case et al. | |
| 2015/0205398 A1* | 7/2015 | Le | G06T 11/203 345/173 |
| 2015/0379336 A1* | 12/2015 | Hoshi | G06K 9/00429 382/187 |
| 2017/0185581 A1* | 6/2017 | Bojja | G06K 9/6269 |

OTHER PUBLICATIONS

"You Doodle—draw on photos, draw on pictures, fun", https://itunes.apple.com/gb/app/you-doodle-draw-on-photos/d517871755?mt=8, Retrieved on: Nov. 8, 2016, 3 pages.

Cipriani, Jason, "Messages on iOS 10: How to use all the crazy new features", https://www.cnet.com/how-to/complete-guide-to-messages-imessage-ios-10/, Published on: Sep. 14, 2016, 17 pages.

Mundhra, Ganesh, "How to Convert Handwriting into Text with S Pen on Galaxy Note 5", http://phoneradar.com/how-to-convert-handwriting-into-text-with-s-pen-on-galaxy-note-5/, Published on: Sep. 12, 2015, 10 pages.

Benjamin, Jeff, "IOS 10: How to use stickers, iMessages apps, Digital Touch, rich links, and more in the new Messages app", https://9to5mac.com/2016/09/14/ios-10-how-to-use-stickers-imessages-apps-digital-touch-rich-links-and-more-in-the-new-ios-10-messages-app-video/, Published on: Sep. 14, 2016, 31 pages.

Caldwell, Serenity, "Best drawing apps for Apple Pencil and iPad", http://www.imore.com/best-apps-drawing-ipad-pro-apple-pencil, Published on: Feb. 3, 2016, 25 pages.

Sun, et al., "Enhancing Naturalness of Pen-and-Tablet Drawing through Context Sensing", In Proceedings of the ACM International Conference on Interactive Tabletops and Surfaces, Nov. 13, 2011, pp. 83-86.

Goldberg, et al., "Doodling our way to better authentication", In Proceedings of Extended Abstracts on Human Factors in Computing Systems, Apr. 20, 2002, pp. 868-869.

Olsen, et al., "Stroke extraction and classification for mesh inflation", In Proceedings of the Seventh Sketch-Based Interfaces and Modeling Symposium, Jun. 7, 2010, pp. 9-16.

* cited by examiner

CONTEXT-BASED SHAPE EXTRACTION AND INTERPRETATION FROM HAND-DRAWN INK INPUT

BACKGROUND

Electronic devices, such as personal computers, laptops, mobile phones, and the like are increasingly equipped with touch screens or similar interfaces that enable a user to provide input by writing or drawing with a stylus, pen, or finger. For instance, tablet computers, which include touch screens as the primary user interface, have become popular alternatives to conventional laptops with keyboards, mice, etc. The ability to draw or write by hand on the touch screen offers substantial flexibility regarding possible inputs. However, writing and drawing do not provide uniform results from user to user. People have different handwriting and drawing styles, they may write with different hands, or use different implements, etc. Consistently and accurately interpreting writing and drawing input is a challenge considering the proliferation of touch screen enabled devices.

Modern devices with touch screens typically include handwriting interpretation capability to some degree. However, the handwriting interpretation does not enable the use of drawings and/or symbols other than letters, numbers, and punctuation. The touch screen provides significant flexibility with respect to input that may be entered, but that input is limited by a lack of interpretation capability for shapes, drawings, non-text expressions, etc.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A computerized method comprises receiving input from a user, extracting a shape from the received input, determining an entity associated with the extracted shape, the determined entity having a type, and rendering, by an annotation engine, the entity to the user based on the type.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein:

In FIGS. 1 to 7, the systems are illustrated as schematic drawings. The drawings may not be to scale.

DETAILED DESCRIPTION

Figure 1:
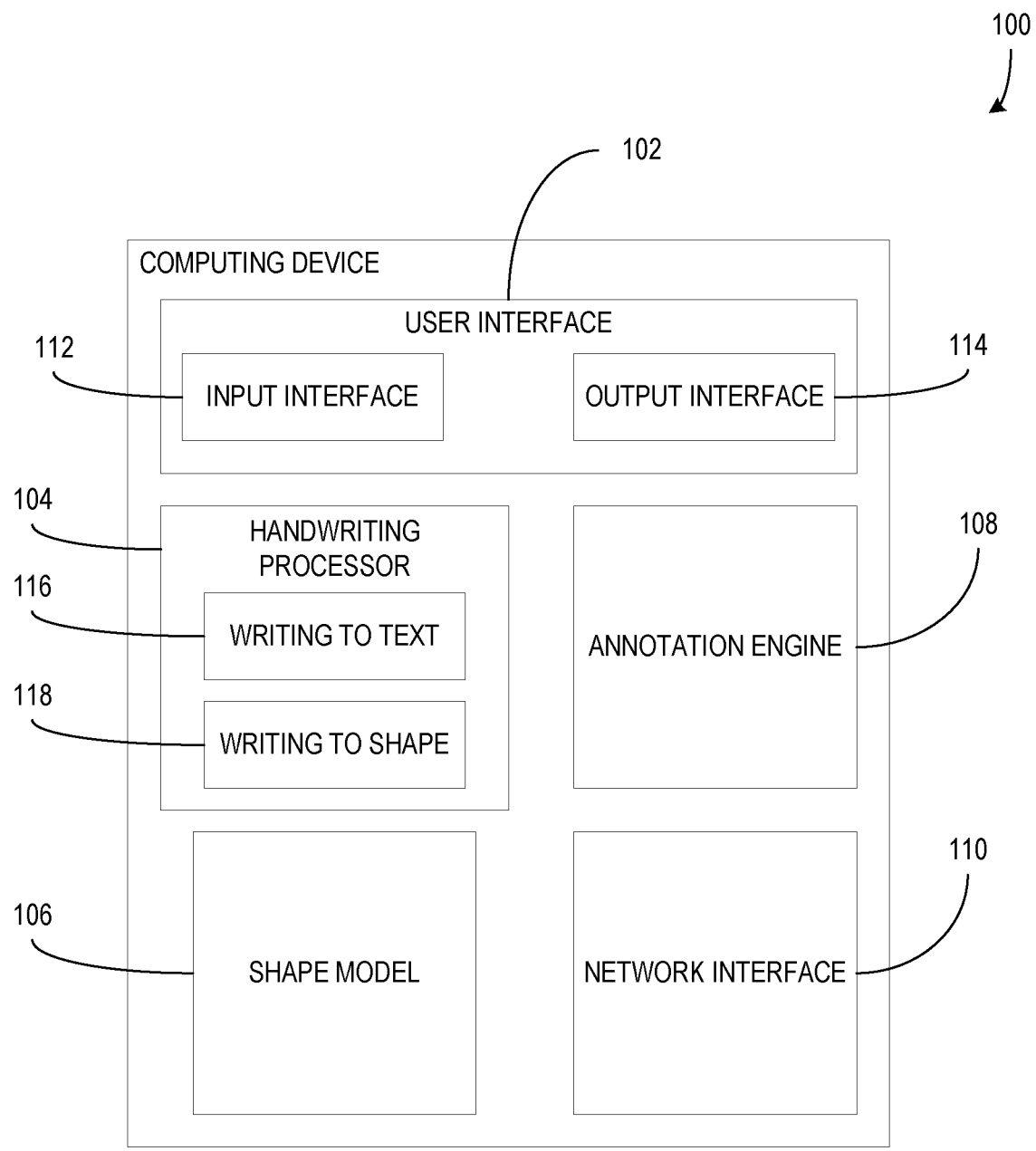
FIG. 1 illustrates a block diagram of an electronic device including a shape model according to an embodiment.

The detailed description provided below in connection with the appended drawings is intended as a description of a number of embodiments and is not intended to represent the only forms in which the embodiments may be constructed, implemented, or utilized. Although the embodiments may be described and illustrated herein as being implemented in devices such as a server, personal computer, mobile device, or the like, this is only an exemplary implementation and not a limitation. As those skilled in the art will appreciate, the present embodiments are suitable for application in a variety of different types of computing devices, for example, PCs, servers, laptop computers, tablet computers, etc.

The terms 'computer', 'computing apparatus', 'mobile device' and the like are used herein to refer to any device with processing capability such that it can execute instructions. Those skilled in the art will realize that such processing capabilities are incorporated into many different devices and therefore the terms 'computer' and 'computing apparatus' each may include PCs, servers, laptop computers, mobile telephones (including smart phones), tablet computers, media players, games consoles, personal digital assistants, and many other devices.

The electronic devices described below are configured to enhance user experience associated with drawing or otherwise inputting shape data into the electronic devices. Shape input data is identified and matched against known shape patterns and, when a match is found, an entity associated with the shape is determined. The entity is converted into an annotation for rendering and/or displaying to the user. The shape identification, entity determination, and annotation conversion may all be based on one or more context elements to increase the accuracy of the shape interpretation. In particular, elements of conversations held via the electronic devices may be used as context for the shape interpretation. Further, machine learning techniques may be applied based on a variety of feedback data to improve the accuracy, speed, and/or performance of the shape interpretation process.

The described devices enhance the ways people communicate and express themselves, enabling and simplifying the use of more than just writing and speech. Emojis, stickers, and other symbols are an increasingly popular way that people share their feelings and share experiences. People use pens to write, doodle, circle, create graphs, and other visual representations of their thoughts, and the disclosure interprets these visual representations. Using the described devices and/or methods, people can use doodles and gestures to communicate more openly and creatively.

Communication between people using the described shape extraction and interpretation methods may become faster, more efficient, and more intuitive as the shape interpretation provides increasingly accurate annotations for drawn shapes. Users may learn to rely more on intuitive drawings of commonly used expressions or complex ideas rather than attempting to write them in words, reducing time spent by the users and chance of user errors, and increasing user satisfaction and enjoyment with the communication user interface.

FIG. 1 illustrates a block diagram of an electronic device, computing device 100, including a shape model according to an embodiment. The computing device 100 comprises a user interface 102, a handwriting processor 104, a shape model 106, an annotation engine 108, and a network interface 110. The user interface 102 comprises an input interface 112 and an output interface 114. The handwriting process comprises a writing to text converter 116 and a writing to shape converter 118.

In general, the user interface 102 includes a graphics card for displaying data to the user and receiving data from the user. The user interface 102 may also include computer-executable instructions (e.g., a driver) for operating the graphics card. Further, the user interface 102 may include a display (e.g., a touch screen display or natural user interface) and/or computer-executable instructions (e.g., a driver) for operating the display. The user interface 102 may also include one or more of the following to provide data to the user or receive data from the user: speakers, a sound card, a camera, a microphone, a vibration motor, one or more accelerometers, a BLUETOOTH brand communication module, global positioning system (GPS) hardware, and a photoreceptive light sensor. For example, the user may input commands or manipulate data by moving the computing device in a particular way.

In an example, the user interface 102 includes a touch screen interface. The input interface 112 includes a layer or portion of the touch screen interface that detects the location of contact, depression, or the like on the touch screen interface. Contact on the touch screen interface, whether by a user's finger, pen, stylus, or the like, is detected by the input interface 112 and interpreted as input to the user interface 102. The output interface 114 includes a layer or portion of the touch screen interface that displays, renders, or otherwise outputs information to a user of the computing device 100. The output interface 114 may display colors, shapes, letters, or the like to communicate output information to a user of the electronic device.

Alternatively, or additionally, the input interface 112 may include a pen device linked to the computing device 100. The pen device may include pressure sensors, accelerometers, buttons, or the like that enable a user of the pen device to provide input to the computing device 100. The pen device sensors may detect movement, gestures, etc. of the pen device and provide the detected movement as input to the computing device 100. Further, the pen device may also function as an output interface 114 by providing information to a user of the electronic device from the electronic device. The pen device and computing device 100 may be in communication via the network interface 110 of the computing device 100.

In an example, the input interface 112 may include other interface, such as keyboards, mice, switches, buttons, microphones, cameras, motion detection, etc. These components of the input interface 112 further enable a user to input information into the computing device 100. For instance, a camera (e.g., a HoloLens, etc.) of input interface 112 may detect a user's gestures and interpret the gestures as a form of input information.

In an example, the output interface 114 may further include speakers, vibration components, projector components, etc. These components of the output interface 114 further enable the computing device 100 to communicate output information to a user. For instance, a vibration component of the output interface 114 may vibrate to provide a notification to the user of the computing device 100.

The handwriting processor 104 receives handwriting data, or "ink data", and converts it into a form of data usable by other components of the electronic device. In an example, the handwriting processor 104 includes a writing to text converter 116 and a writing to shape converter 118. The handwriting processor 104 may identify received ink data as either written text or a written shape based on pattern recognition techniques. If the ink data is determined to be handwritten text, the ink data is converted to text data by the writing to text converter 116. However, if the ink data is determined to be a written shape, the ink data is converted to a shape, or shape data, by the writing to shape converter 118. In an example, received ink data may represent written text, drawn shapes, doodles, circling of text or objects, creating graphs, drawn expressions, gestures, etc.

The shape model 106 receives shapes and/or shape data and determines an associated entity based on the received shapes and/or shape data. In an example, the shape model 106 includes a mapping between shapes and entities, such that when a shape is received that is present in the mapping, the mapping provides an entity associated with the shape. The shape model 106 may apply pattern recognition to a received shape to identify the shape and/or match the received shape to a shape that is present in the mapping. In some examples, the shape model 106 may include machine learning, machine vision, static mathematical models, pattern matching, crowd-sourcing, etc.

The annotation engine 108 receives entities and/or entity data and renders and/or displays annotations associated with the received entities based on entity type and/or other defined entity display rules. The annotation engine 108 may include a mapping between defined entity types and rendered annotations. For instance, an entity that is identified as an emoticon entity type may be mapped to an emoticon annotation that renders as a small graphic to a user while an entity that is identified as a list entity type may be mapped to a list annotation that renders as a bullet list of text segments.

The network interface 110 provides an interface by which the computing device 100 may communicate with other electronic devices, computing devices, access points, or the like. The network interface 110 may provide access to one or more channels of network communication, including wired network connections, wireless network connections, etc. In some examples, components described as being part of the computing device 100 may instead be located outside of the computing device 100 and accessed by the electronic device via the network interface 110.

Figure 2:
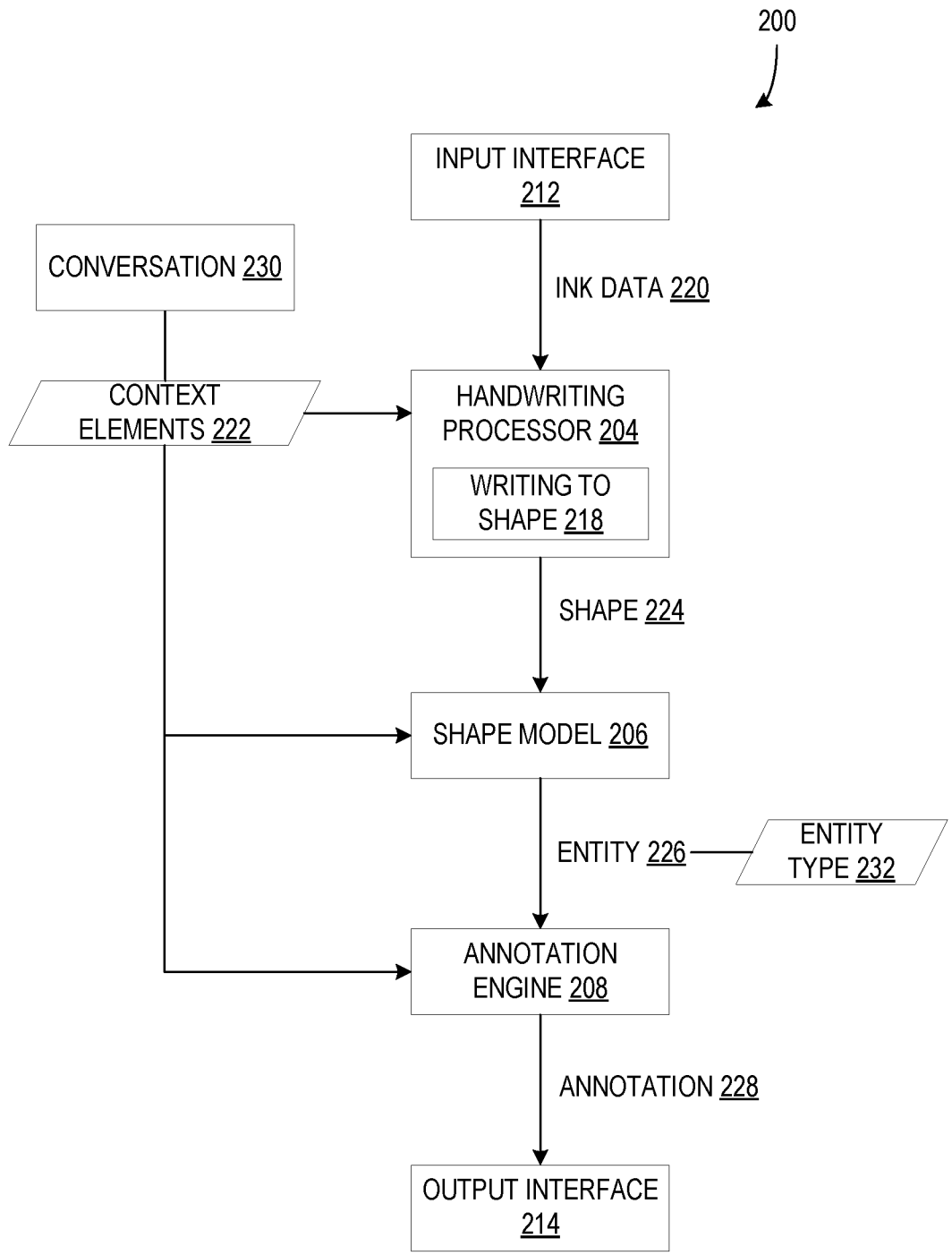
FIG. 2 illustrates a diagram of interactions between components of an electronic device according to an embodiment.

FIG. 2 illustrates a diagram 200 of interactions between components of an electronic device (e.g., computing device 100, etc.) according to an embodiment. The input interface 212 receives ink data 220, which represents drawn and/or handwritten input from a user of the electronic device. The ink data 220 may be in the form of an image file, coordinates of the drawn input, coordinates of the drawn input over time such that the order in which portions of the drawn input are drawn is recorded, etc. The ink data 220 may be representative of handwriting, drawn shapes, doodles, circling of portions of documents or pictures, drawn expressions, other gestures, etc.

The ink data 220 is passed to the handwriting processor 204. The handwriting processor 204 determines whether the ink data 220 represents written text or drawn shapes based on pattern recognition. In an example, the handwriting processor determines that the ink data 220 represents a drawn shape, so the writing to shape converter 218 is used on the ink data 220.

Context elements 222 may be used in determining whether the ink data 220 is identified as handwriting or drawn shapes. Further, the context elements 222 may be used to determine a shape that the ink data 220 represents. Context elements 222 may include additional data and/or values that are available to the electronic device that provide context for the received ink data 220 or other types of data. For instance, context elements 222 may include a detected location of the electronic device (e.g., via a global positional system component, etc.), events from a calendar of a user of the electronic device, a timestamp associated with the ink data, information regarding what is currently displayed on the screen of the electronic device, time taken to draw the ink data, other sensor data (e.g., accelerometers, proximity sensors, etc.), an active application, application identifier, and/or application metadata, data exposed by an active application or background service via application programming interfaces (APIs), location data, received signals, etc. Pattern recognition of the handwriting processor 204 and/or the writing to shape converter 218 may take into account one or more context elements 222 in order to provide determinations based not just on the ink data 220, but also on the context in which the ink data 220 is received by the input interface 212. In an example, a context element of received ink data 220 may be that the ink data 220 is received when a messaging/chat application is active on the electronic device.

Additionally, or alternatively, the content of a conversation 230 (e.g., a time, place, person, or topic mentioned in the conversation, etc.), or a portion/subset of a conversation 230, in a messaging/chat application, or a similar application displayed or otherwise present on the electronic device, may be used as a context element or elements when identifying the ink data 220. Words, phrases, and/or combinations of words/phrases in a conversation 230 occurring on the electronic device may influence how the ink data 220 is identified and/or interpreted. For instance, written or drawn ink data 220 may be more likely to be identified as a common response phrase or drawing to a received message immediately preceding the receipt of the ink data 220 in a current conversation 230. If a received message includes the question, "What time is the meeting?", a written or drawn response is more likely to be interpreted as a time in response to the question, such as "2:30" or "noon" or a drawing of a clock. Further, conversational patterns may be used, such that common exchanges between specific users may make identifying ink data 220 as a common response more likely, such as a conversational exchange between spouses that includes a message, "Heading home" and a common response of "See you soon!" and/or a drawing of a smiling face. Other details specific to a conversation 230, such as names of the participants, may be used as well. For instance, if a conversation 230 includes participants named "Jim" and "Dan", ink data 220 is more likely to be interpreted as "Jim" or "Dan" than it otherwise would be if the participants had different names.

The writing to shape converter 218 outputs a shape 224 based on the ink data 220 and/or the context elements 222. In an example, the shape 224 is a digitized shape object that includes shape data and may include metadata, such as a timestamp, drawn order information, etc. In an example, the shape 224 may be a combination of more than one other shapes.

The shape model 206 receives the shape 224 and provides an entity 226 associated with the shape 224. The shape model 206 classifies the shape 224 as having to one or more shape types or categories, based on shape data, metadata, or the like of the shape 224, in order to provide a matching entity 226. The shape model 206 may assign one or more shape type identifiers to the shape 224 based on the shape types used to classify the shape 224. The shape model 206 may further receive context elements 222 as described above. The context elements 222 received by the shape model 206 may be the same or different from the context elements 222 received by the handwriting processor 204.

In an example, the shape model 206 includes a mapping between shapes and entities, such that when a shape is received that is present in the mapping, the mapping provides an entity associated with the shape. The shape model 206 may apply pattern recognition to a received shape in order to identify the shape and/or match the received shape to a shape that is present in the mapping. In some examples, the shape model 206 may include machine learning, machine vision, static mathematical models, pattern matching, crowd-sourcing, etc.

In an example, pattern recognition in the shape model 206 may include a plurality of defined shape patterns to which the shape model 206 matches a received shape 224. The shape model 206 and/or the plurality of defined shape patterns may include one or more pattern match thresholds, pattern match confidence levels, or the like, which determine whether a received shape 224 sufficiently matches a defined shape pattern to provide the entity associated with the matched shape pattern as output. For instance, a pattern match threshold for a shape pattern may be a percentage portion of the received shape 224 that matches the shape pattern, or a percentage of "closeness" that the received shape 224 is to matching the shape pattern. If a pattern match threshold of a shape pattern is 70%, a received shape 224 that is a 50% match to the shape pattern will not be considered a match, while a received shape 224 that is an 80% match of the shape pattern will be considered a match.

The pattern match threshold of a shape pattern may be affected/adjusted based on context elements 222, making shape pattern matching more or less likely depending on the context of the received shape 224. The defined shape patterns may include or be associated with context element patterns that, when matched to context elements 222 associated with the received shape 224, affect/adjust the likelihood of a match between the shape pattern and the received shape 224 and/or cause the received shape 224 to be matched to the shape pattern, and thereby influence the determination of an entity based on the received shape 224 and context elements 222. For instance, if the context elements 222 include elements that match a context element pattern indicating that the received shape 224 is associated with a conversation (e.g., conversation 230, etc.) in which a message was recently received, shape pattern thresholds of defined shape patterns associated with the matched context element pattern may be adjusted such that the received shape 224 is more likely to match the defined shape patterns, such as emoticon shape patterns that are common responses during conversations.

A match of a received shape 224 to a shape pattern of the shape model 206 and/or associated context elements 222 to a context element pattern may result in an entity 226 associated with the matched shape pattern and/or matched context element pattern being provided to the annotation engine 208. Entity 226 may have an entity type 232. An entity type 232 defines the entity such that components of the electronic device can render and/or interact with the entity. For instance, an entity may be of an expression type, a list type, a graph type, an emoticon type, a highlighting type, an event/time type, a location type, etc. It should be understood that other entity types 232 may be used without departing from the description herein. The type 232 of an entity 226 may be stored as metadata with the entity 226. In an example, the entity 226 may have one type 232, or alternatively, the entity 226 may have more than one type 232. The entity 226 may further include other data defining the specific entity 226 and/or providing information that may be useful in rendering or otherwise displaying the entity 226.

The entity 226 is received by the annotation engine 208, which converts the entity 226 into an annotation 228. The annotation engine 208 may also receive context elements 222 that may be used during the conversion to the annotation 228. The context elements 222 received and used by the annotation engine 208 may be the same or different from the context elements 222 used by the handwriting processor 204 and/or the shape model 206. For example, a context element 222 that includes currently active application information may be used by the annotation engine 208 to determine how to convert the entity 226 into an annotation 228. The entity 226 may be converted into an annotation 228 that is compatible with the currently active application based on the provided context element 222.

Once the annotation engine 208 converts the entity 226 into an annotation 228, the annotation 228 may be provided to the output interface 214 for rendering and/or display to a user of the electronic device. For instance, ink data 220 may be interpreted as an emoticon and the annotation 228 may be rendered as a version of the emoticon using the current font of the active application or as a graphical representation of the emoticon in the active application. Alternatively, the ink data 220 may be interpreted as a list of items and the annotation 228 may be rendered and/or displayed as a bulleted list, list with checkboxes, or the like on the output interface 214. The annotation 228 may also cause a new or different application to become active and render and/or display the annotation 228. For instance, if the annotation 228 represents an event object and a calendar application is not currently active, the calendar application may be activated on the output interface 214 and the event annotation 228 may be included in calendar application, where it may be highlighted to indicate that the event has been recently added.

In another example, a user is discussing plans with another person via an application on an electronic device. The other person sends a message to the user letting the user know that he/she is at a destination location where they planned to meet. The user responds by drawing a clock shape on the interface of the electronic device. Based on the context of the conversation, the clock shape is interpreted by the electronic device as an entity that responds to the user with a message including an estimated time of arrival at the destination location. The context elements considered by the electronic device may include the name of the destination location, the current location of the user, the current time, etc.

In a further example, a user is discussing movie plans with another person via an application on an electronic device. The user mentions in the conversation that he/she is not available at 7 PM. The user draws a bulleted list of possible movies and associated movie times. The electronic device interprets the drawn list as a bulleted list entity and, based on the user's previously mentioned unavailability at 7 PM, automatically crosses out the movie times at and/or around 7 PM.

In an example, an electronic device comprises a screen interface; at least one processor; and at least one memory comprising computer program code, the at least one memory and the computer program code configured to, with the at least one processor, cause the electronic device to at least: receive input from the screen interface; extract a shape from the received input; determine an entity associated with the extracted shape based on at least one context element, the determined entity having a type; and display the entity on the screen interface, wherein the entity is displayed in a pattern based on the type.

The processor includes any quantity of processing units, and is programmed to execute computer-executable instructions for implementing aspects of the disclosure. The instructions may be performed by the processor or by multiple processors within the computing device, or performed by a processor external to the computing device. In some examples, the processor is programmed to execute instructions such as those illustrated in the figures (e.g., FIGS. 4, 5, and 6).

In some examples, the processor represents an implementation of analog techniques to perform the operations described herein. For example, the operations may be performed by an analog computing device and/or a digital computing device.

The computing device further has one or more computer readable media such as the memory area. The memory area includes any quantity of media associated with or accessible by the computing device. The memory area may be internal to the computing device, external to the computing device, or both. In some examples, the memory area includes read-only memory and/or memory wired into an analog computing device.

The memory area stores, among other data, one or more applications. The applications, when executed by the processor, operate to perform functionality on the computing device. Exemplary applications include mail application programs, web browsers, calendar application programs, address book application programs, messaging programs, media applications, location-based services, search programs, and the like. The applications may communicate with counterpart applications or services such as web services accessible via a network. For example, the applications may represent downloaded client-side applications that correspond to server-side services executing in a cloud.

Figure 3:
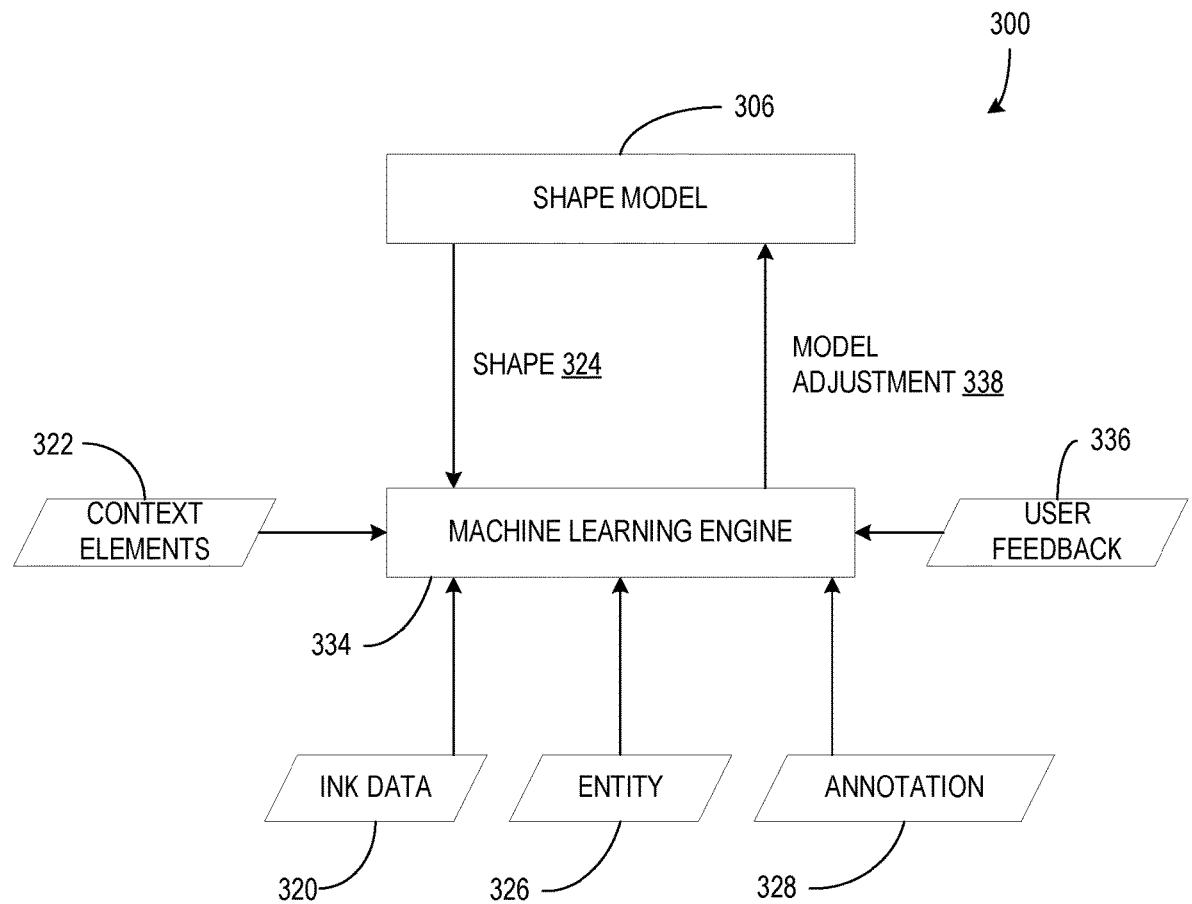
FIG. 3 illustrates a diagram of interactions between a machine learning engine and a shape model according to an embodiment.

FIG. 3 illustrates a diagram of interactions between a machine learning engine 334 and a shape model 306 according to an embodiment. The shape model 306 determines an entity 326 based on a received shape 324 as described above. While the system described above converts drawn ink data (e.g., ink data 320, etc.), into annotations (e.g., annotation 328, etc.), the machine learning engine 334 collects feedback data associated with the various stages of the process. For instance, the machine learning engine 334 may collect feedback data in the form of ink data 320, context elements 322, shape 324, entity 326, annotation 328, user feedback 336, etc. The machine learning engine 334 may apply machine learning techniques using the collected feedback data to determine model adjustments 338 that may be applied to the shape model 306 to improve future performance by the shape model 306.

The machine learning engine 334 may include one or more model performance goals which drive the model adjustments 338 determined by the engine 334. For instance, a model performance goal may be that the determined entity 326 is accepted as correct by the user at least a defined percentage (e.g., 70%, 80%, 90%, etc.) of the time. Alternatively, or additionally, a model performance goal of the machine learning engine 334 may be that the time required to convert ink data 320 to annotation 328 be less than a defined time amount (e.g., 500 milliseconds, 1 second, 1.5 seconds, etc.). The machine learning engine 334 may include more, fewer, or different model performance goals than those described here without departing from the scope of the description. In some examples, a user selects one or more performance goals for the machine learning engine 334. For instance, the user can select to have fast results or slower results that may be more accurate.

In order to pursue model performance goals, the machine learning engine 334 may apply model adjustments 338 to the shape model 306. The machine learning engine 334 may use any and/or all feedback data received (e.g., ink data 320, context elements 322, shape 324, entity 326, annotation 328, user feedback 336, etc.), as well as past model adjustments, past feedback data, results of past model adjustments, statistical analysis of past data, etc. when determining model adjustments.

Model adjustments 338 may include creating new shape patterns and/or associated entities, removing shape patterns and/or associated entities, adjusting shape patterns and/or associated entities, etc. Adjusting a shape pattern may include increasing and/or decreasing pattern match thresholds, creating new pattern match thresholds, or removing pattern match thresholds. A shape pattern may be adjusted so that future shapes may be more likely to match when they include portions that are similar to shapes that are known to have matched previously. Alternatively, or additionally, a shape pattern may be adjusted so that future shapes may be less likely to match when they include portions that are similar to shapes that are known to have failed to match previously. Further, a shape pattern may be associated with a new entity, and/or an association with an entity may be removed from a shape pattern.

User feedback 336 may be used as feedback data by the machine learning engine 334. For instance, when a user of the device accepts a displayed annotation 328, the machine learning engine 334 may use that user feedback 336 to indicate that the shape model provided an accurate entity 326 with respect to the received shape 324. The machine learning engine 334 may strengthen the association of the accepted entity 326 with shapes similar to the converted shape 324 and/or adjust pattern match thresholds of a matched shape pattern. Alternatively, when a user declines or rejects a displayed annotation 328, the machine learning engine 334 may use that user feedback 336 to indicate that the shape model provided an inaccurate entity 326 with respect to the received shape 324. The machine learning engine 334 may weaken or remove the association of the rejected entity 326 with shapes similar to the converted shape 324 and/or adjust pattern match thresholds of a matched shape pattern.

In an example, the machine learning engine 334 may make model adjustments 338 to the shape model 306 to determine effects, if any, of the adjustment 338 on the performance of the model 306. After a model adjustment 338 is made, the machine learning engine 334 may attribute performance changes to the model adjustment 338, to some degree. The machine learning engine 334 may make future model adjustments 338 based on performance change attributions of past adjustments.

The shape model 306 may be trained in a training mode, wherein users provide immediate feedback to ink data that they provide. For instance, users may draw shapes, symbols, and the like, and immediately label their drawings with an entity or entity type. Training mode data and associations may be collected from one or more users providing one or more drawings and associated entities. These associations may then be provided to devices as default or starter shape models, which may then be further adjusted by a machine learning engine as described above.

In an example, the machine learning engine 334 is disposed on the same electronic device as the shape model 306. Alternatively, the machine learning engine 334 may be disposed on a separate electronic device, server, or the like than the shape model 306. In this case, the machine learning engine 334 and shape model 306 may communicate over a network interface (e.g., network interface 110, etc.).

The machine learning engine 334 may gather feedback from the device specific to the shape model 306 and the adjustments provided by the machine learning engine 334 may be specific to the use of the device and/or behaviors of a user of the device. Alternatively, the machine learning engine 334 may gather feedback from more than one device or other feedback source. This may result in model adjustments 338 that are more "one size fits all" in nature.

In some examples, the machine learning engine 334 comprises a trained regressor such as a random decision forest, directed acyclic graph, support vector machine, neural network, or other trained regressor. The trained regressor may be trained using the input and feedback data described above. Examples of trained regressors include a convolutional neural network and a random decision forest. It should further be understood that the machine learning engine 334, in some examples, may operate according machine learning principles and/or techniques known in the art without departing from the systems and/or methods described herein.

A machine learning engine 334 may be available at the computing device 100 as shown in FIG. 1. In alternative examples, a machine learning engine 334 may be disposed at another computing device which receives and processes the data from the computing device 100. Where the machine learning engine 334 is at the computing device 100, it comprises software stored in memory and executed on a processor in some cases. In some examples the machine learning engine 334 is executed on an FPGA or a dedicated chip. For example, the functionality of the machine learning engine 334 may be implemented, in whole or in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

Figure 6:
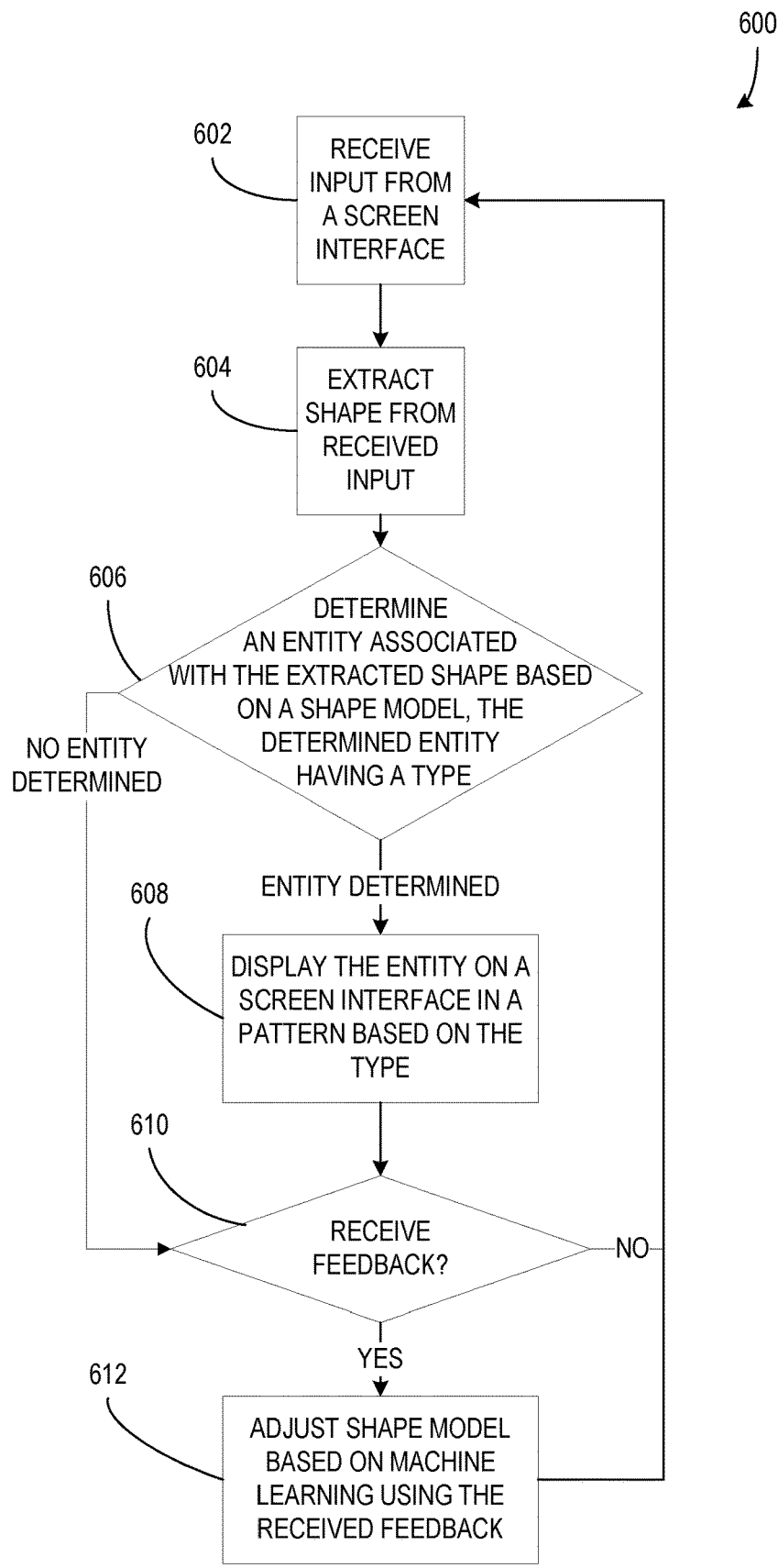
FIG. 6 illustrates a flow chart of a method of receiving shape input, rendering an annotation entity associated with the received shape input, and adjusting a shape model based on machine learning using received feedback according to an embodiment.

The machine learning engine 334 is arranged to execute the methods described herein with respect to FIG. 6 to determine shape model adjustments 338 in a manner which allows for improved performance when converting ink data to rendered/displayed annotations.

In an example, the machine learning engine may make use of training data pairs when applying machine learning techniques and/or algorithms. Millions of training data pairs (or more) may be stored in a machine learning data structure. In some examples, a training data pair includes an input or feedback data value paired with a model adjustment value.

The pairing of the two values demonstrates a relationship between the input or feedback data value and the model adjustment value that may be used by the machine learning engine 334 to determine future model adjustments 338 according to machine learning techniques and/or algorithms.

Figure 4:
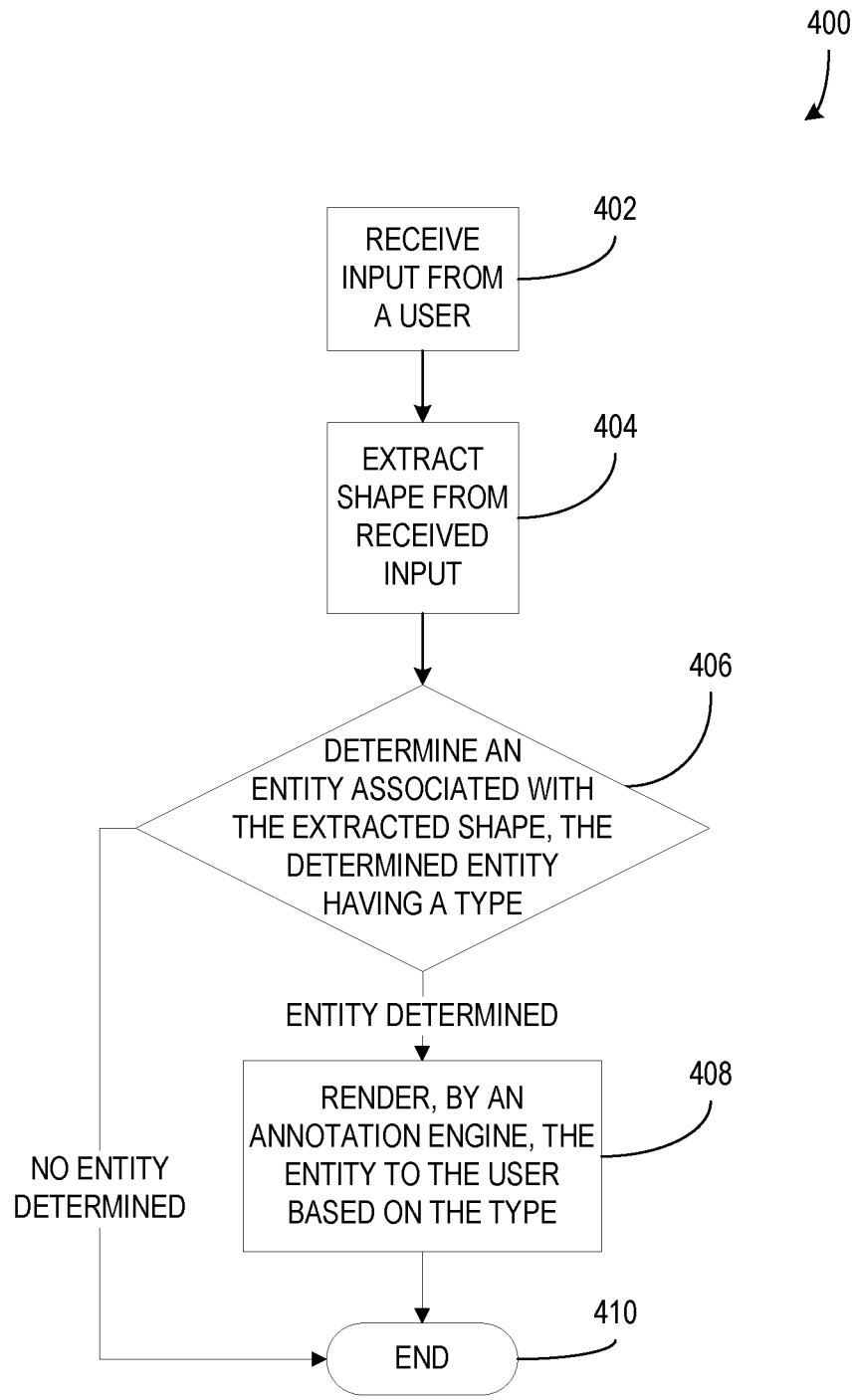
FIG. 4 illustrates a flow chart of a method of receiving shape input and rendering an annotation entity associated with the received shape input according to an embodiment.

FIG. 4 illustrates a flow chart of a method 400 of receiving shape input and rendering an annotation entity associated with the received shape input according to an embodiment. The method 400 comprises receiving, at 402, input from a user and extracting, at 404, a shape from the received input. Further, context elements (e.g., a timestamp, an application identifier, a location, or a calendar event, etc.) associated with the user input and/or extracted shape may be collected.

At 406, an entity associated with the extracted shape is determined if possible and the determined entity may have an entity type (e.g., a list, an event, a location, or an expression, etc.). In an example, determining the entity includes providing the extracted shape to a shape model as input and receiving the determined entity from the shape model as output. The shape model may include a plurality of shape patterns associated with entities. When the extracted shape received by the shape model matches a shape pattern of an entity, the entity associated with the matched shape pattern is provided by the shape model. Alternatively, or additionally, the shape model may include a plurality of context element patterns associated with entities. When the shape model receives at least one context element associated with an extracted shape as input and the at least one context element matches a context element pattern associated with an entity, the entity associated with the matched context element pattern is provided by the shape model.

In some examples, an entity may not be determined based on the extracted shape and/or context elements. When an entity is not or cannot be determined, the method 400 may end at 410. Alternatively, or additionally, the extracted shape may be provided, rendered, or otherwise displayed to a user in order for the user to take a desired action with the extracted shape (e.g., saving the extracted shape, sending the extracted shape, adjusting the extracted shape, etc.).

When an entity is determined, the entity is rendered, by an annotation engine, to the user based on the type at 408. For instance, the entity may be displayed to the user on a screen interface. Finally, the method 400 ends at 410.

Figure 5:
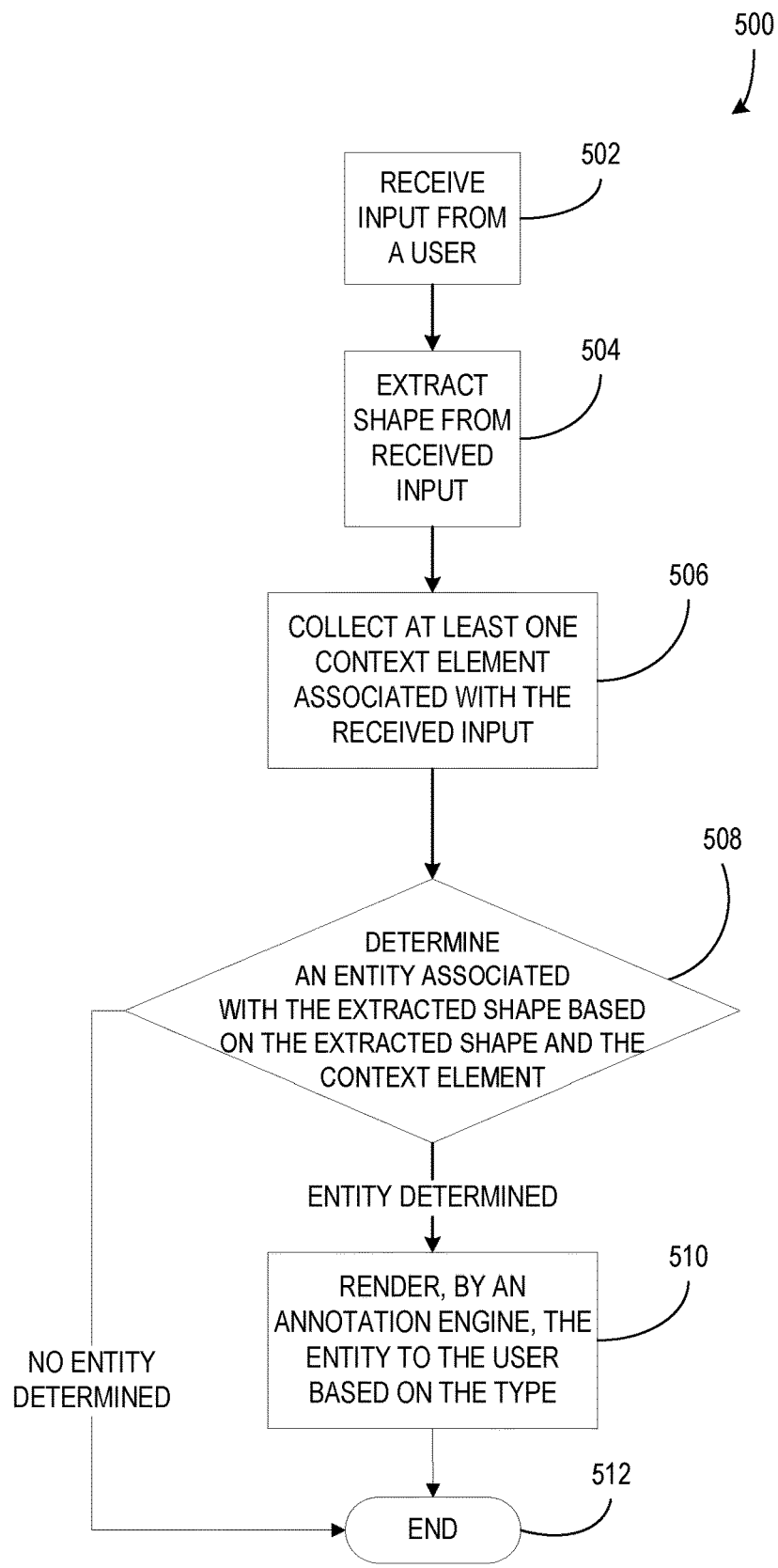
FIG. 5 illustrates a flow chart of a method of receiving shape input and rendering an annotation entity associated with the received shape input based, at least in part, on at least one context element according to an embodiment.

FIG. 5 illustrates a flow chart of a method 500 of receiving shape input and rendering an annotation entity associated with the received shape input based, at least in part, on at least one context element according to an embodiment. The method 500 comprises receiving, at 502, input from a user and extracting, at 504, a shape from the received input. At least one context element associated with the receive input is collected at 506.

At 508, an entity associated with the extracted shape is determined based on the extracted shape and the at least one context element. The determined entity may include an entity type. Determining the entity may include a shape model (e.g., shape model 106, 206, 306, etc.) receiving the extracted shape and the context element(s) as input. The shape model may then provide an entity associated with the extracted shape and context element(s). In a further example, a machine learning engine adjusts the shape model (e.g., adjusting at least one pattern match threshold of the shape model, etc.) based on feedback as described above.

In some examples, an entity may not be determined based on the extracted shape and/or context elements. When an entity is not or cannot be determined, the method 500 may end at 512. Alternatively, or additionally, the extracted shape may be provided, rendered, or otherwise displayed to a user in order for the user to take a desired action with the extracted shape (e.g., saving the extracted shape, sending the extracted shape, adjusting the extracted shape, etc.).

When an entity is determined, the entity is then rendered to the user, by an annotation engine, based on the entity type at 510. For instance, the entity may be displayed to the user on a screen interface. Finally, the method 500 ends at 512.

In an example, one or more computer storage media have computer-executable instructions that, upon execution by a processor, cause the processor to execute the method 500.

FIG. 6 illustrates a flow chart of a method 600 of receiving shape input, rendering an annotation entity associated with the received shape input, and adjusting a shape model based on machine learning using received feedback according to an embodiment. The method 600 comprises receiving, at 602, input from a screen interface; extracting, at 604, a shape from the received input; and determining, if possible, at 606, an entity associated with the extracted shape based on a shape model wherein the determined entity has a type. As described above, in some examples, an entity is not determined based on the extracted shape (or any associated context elements, etc.). When an entity is not determined, the method 600 proceeds to 610 to possibly receive feedback.

When an entity is determined at 606, the entity is displayed on the screen interface at 608, wherein the entity is displayed as an annotation based on the type, as described above. At 610, feedback may be received that may be associated with the determined entity, the extracted shape, the lack of a determined entity, etc. For instance, when an entity is determined and displayed on the screen interface, feedback may be received indicating the accuracy of the determined entity with respect to the received input and/or extracted shape. Alternatively, when an entity is not determined, feedback may be received indicating an entity and/or entity type with which the received input is intended to be associated.

When feedback is received, the shape model is adjusted at 612 based on machine learning using the received feedback. Alternatively, when feedback is not received, the shape model is not adjusted. In either case, the interface may be ready to receive additional input at the screen interface again at 602.

In an example, a user may send a friend a message about a movie that they saw the night before using a messaging application on an electronic device (e.g., computing device 100, etc.). The user may transcribe the message with a pen and/or stylus on a touch screen of the electronic device because she finds it faster and more natural. The user may draw a laughing face when recounting a funny scene in the movie. The electronic device may detect that the user has drawn a face and send it as an emoji to the friend with the rest of the message via the messaging application. The custom emoji helps the friend understand the user's sentiment more clearly.

In another example, a user may send his spouse a grocery list via a messaging application on an electronic device. The user may draw bullets for each item in the list, which may indicate to the electronic device that the drawn items are a list. When the message with the list is sent, it may be received by the spouse's phone. A messaging application on the spouse's phone may notify her that she's received a list of items, which she may then view in a to-do list application or the like, enabling her to check off items as she finds them.

A user may also use an electronic device to let her spouse know that she'll be late for dinner. The user may draw a clock on the touch screen in an active messaging application window. The electronic device may interpret the clock according to the context of the messaging application and suggest that the user is trying to send a "Running late!" message. The user may confirm that this is correct, causing the message to be sent to the user's spouse.

In another scenario, a user may draw a street intersection that may include street names or other identifying information. The electronic device may interpret the street intersection as a location on a map and may provide a map image of the drawn intersection and/or a link to an online map site or application that is focused on the drawn location.

A sample scenario contemplates a user writing an address. The electronic device may interpret the address as a location on a map and may provide a map image of the address and/or a link to an online map site or application that is focused on the address.

Another sample scenario contemplates a user writing a phone number. The electronic device may interpret the phone number as associated with an address book contact and/or contact list and may display contact information associated with the written phone number, if such a contact exists. If the phone number is not present in the contact list, a new entry in the contact list associated with the phone number may be created, etc.

In an example, a user may draw a drawing or expression that is not matched to a pattern by the electronic device. The electronic device may convert the drawing to an image file and associated the image file with a communication the user may currently be sending. For instance, a drawing image file may be attached to an email that the user was drafting, or a message that the user was writing.

Figure 7:
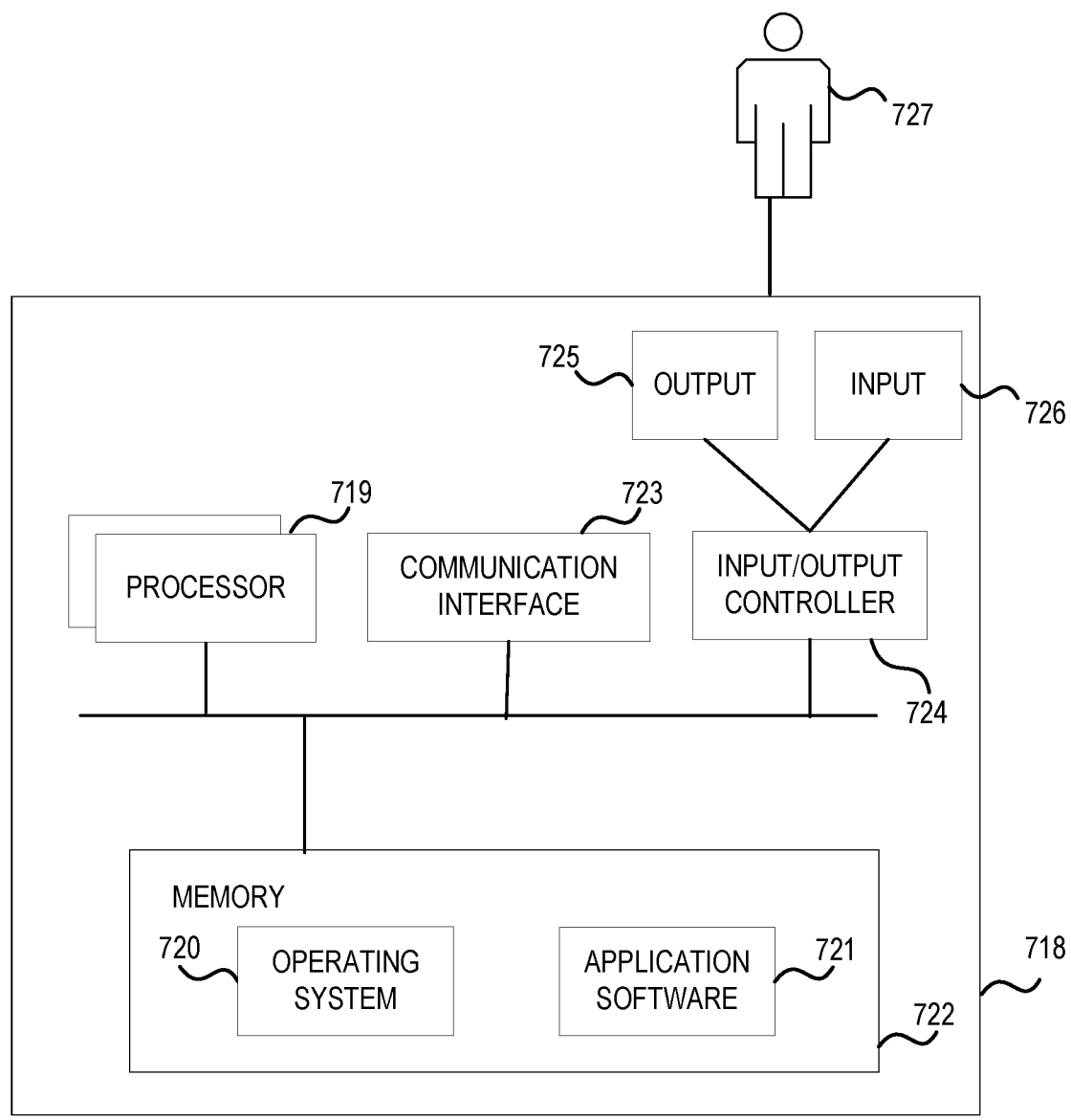
FIG. 7 illustrates a computing apparatus according to an embodiment as a functional block diagram.

FIG. 7 illustrates a computing apparatus 718 according to an embodiment as a functional block diagram. In an embodiment, components of a computing apparatus 718 may be implemented as a part of an electronic device and/or computing device according to one or more embodiments described in this specification. The computing apparatus 718 comprises one or more processors 719 which may be microprocessors, controllers or any other suitable type of processors for processing computer executable instructions to control the operation of the electronic device. Platform software comprising an operating system 720 or any other suitable platform software may be provided on the apparatus 718 to enable application software 721 to be executed on the device. According to an embodiment, identifying a shape based on ink data, determining an entity associated with the shape, and determining an annotation of the entity, all of which may be based on one or more context elements, may be accomplished by software. Furthermore, it may receive network communications from other computing devices via a network or other type of communication link pertaining to shape identification, interpretation, or the like. It may further update a shape model based on machine learning techniques as described herein.

Computer executable instructions may be provided using any computer-readable media that are accessible by the computing apparatus 718. Computer-readable media may include, for example, computer storage media such as a memory 722 and communications media. Computer storage media, such as a memory 722, include volatile and non-volatile, removable and non-removable media implemented in any method or technology for storage of information such as computer readable instructions, data structures, program modules or the like. Computer storage media include, but are not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 722) is shown within the computing apparatus 718, it will be appreciated by a person skilled in the art, that the storage may be distributed or located remotely and accessed via a network or other communication link (e.g. using a communication interface 723).

The computing apparatus 718 may comprise an input/output controller 724 configured to output information to one or more output devices 725, for example a display or a speaker, which may be separate from or integral to the electronic device. The input/output controller 724 may also be configured to receive and process an input from one or more input devices 726, for example, a keyboard, a microphone or a touchpad. In one embodiment, the output device 725 may also act as the input device. An example of such a device may be a touch sensitive display. The input/output controller 724 may also output data to devices other than the output device, e.g. a locally connected printing device. In some embodiments, a user 727 may provide input to the input device(s) 726 and/or receive output from the output device(s) 725.

The functionality described herein can be performed, at least in part, by one or more hardware logic components. According to an embodiment, the computing apparatus 718 is configured by the program code when executed by the processor 719 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

Although some of the present embodiments may be described and illustrated as being implemented in a smartphone, a mobile phone, or a tablet computer, these are only examples of a device and not a limitation. As those skilled in the art will appreciate, the present embodiments are suitable for application in a variety of different types of devices, such as portable and mobile devices, for example, in laptop computers, tablet computers, game consoles or game controllers, various wearable devices, etc.

At least a portion of the functionality of the various elements in FIG. 7 may be performed by other elements in FIG. 7, or an entity (e.g., processor, web service, server, application program, computing device, etc.) not shown in FIG. 7.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

Alternatively, or in addition to the other examples described herein, examples include any combination of the following:

An electronic device comprising:

a screen interface displaying at least a portion of a conversation;

at least one processor; and at least one memory comprising computer program code, the at least one memory and the computer program code configured to, with the at least one processor, cause the electronic device to at least:

receive input from the screen interface;

extracting a shape from the received input;

determining an entity associated with the extracted shape based on at least one context element associated with the conversation, the determined entity having a type; and displaying the entity on the screen interface, wherein the entity is displayed in a pattern based on the type.

The electronic device described above, wherein the at least one context element includes at least one of a time mentioned in the conversation, a place mentioned in the conversation, a person mentioned in the conversation, or a topic mentioned in the conversation.

The electronic device described above, wherein the at least one context element includes a destination location mentioned in the conversation and a current location of the electronic device, and wherein the entity includes a message indicating an estimated time of arrival at the destination location.

The electronic device described above, wherein determining an entity is based on a shape model that receives shapes and context elements as input and provides entities as output.

The electronic device described above, wherein the shape model includes a plurality of shape patterns associated with entities; and when a shape received by the shape model matches a shape pattern of the plurality of shape patterns, an entity associated with the matched shape pattern is provided by the shape model.

The electronic device described above, wherein the shape model includes a plurality of context element patterns associated with entities; and when at least one context element received by the shape model matches a context element pattern of the plurality of context element patterns, an entity associated with the matched context element pattern is provided by the shape model.

The electronic device described above, wherein the shape model is adjusted, based on feedback, according to machine learning.

The electronic device described above, wherein the feedback includes at least one of user feedback, context elements, ink data, or shape data.

A method comprising:

receiving input from a user associated with a conversation;

extracting a shape from the received input;

determining an entity associated with the extracted shape based on at least one context element associated with the conversation, the determined entity having a type; and rendering, by an annotation engine, the entity to the user based on the type.

The method described above, wherein the at least one context element includes at least one of a time mentioned in the conversation, a place mentioned in the conversation, a person mentioned in the conversation, or a topic mentioned in the conversation.

The method described above, wherein the at least one context element includes a timestamp, an application identifier, a location, or a calendar event.

The method described above, wherein the type includes at least one of a list, an event, a location, or an expression.

The method described above, wherein rendering, by an annotation engine, the entity to the user based on the type includes displaying the entity on a screen interface to the user.

The method described above, wherein determining an entity includes receiving, by a shape model, the extracted shape as input; and providing, by the shape model, an entity as output.

The method described above, wherein the shape model includes a plurality of shape patterns associated with entities; and when the extracted shape received by the shape model matches a shape pattern of the plurality of shape patterns, an entity associated with the matched shape pattern is provided by the shape model.

The method described above, wherein determining an entity includes receiving, by the shape model, at least one context element as input;

wherein the shape model includes a plurality of context element patterns associated with entities; and when the at least one context element received by the shape model matches a context element pattern of the plurality of context element patterns, an entity associated with the matched context element pattern is provided by the shape model.

One or more computer storage media having computer-executable instructions that, upon execution by a processor, cause the processor to at least:
  receive input from a user associated with a conversation;
  extract a shape from the received input;
  collect at least one context element associated with the received input and with the conversation;
  determine an entity associated with the extracted shape based on the extracted shape and the at least one context element, the determined entity having a type; and
  render, by an annotation engine, the entity to the user based on the type.

The one or more computer storage media described above, wherein determining an entity includes receiving, by a shape model, the extracted shape and the at least one context element as input; and
  providing, by the shape model, the entity associated with the extracted shape and the at least one context element as output.

The one or more computer storage media described above, further including adjusting, by a machine learning engine, the shape model based on feedback.

The one or more computer storage media described above, wherein adjusting the shape model includes adjusting at least one pattern match threshold of the shape model.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute exemplary means for extracting a shape from ink data, determining an entity associated with the extracted shape, and determining/rendering an annotation of the determined entity. The illustrated one or more processors 719 together with the computer program code stored in memory 722 constitute exemplary processing means for collecting data and/or context elements associated with shapes and/or shape models and applying machine learning techniques to adjust the shape models in order to improve the shape-to-entity determinations.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. An electronic device comprising:
  a screen interface displaying at least a portion of a conversation;
  at least one processor; and
  at least one memory comprising computer program code, the at least one memory and the computer program code configured to, with the at least one processor, cause the electronic device to at least:
  receive input from the screen interface;
  extract a shape from the received input;
  compare the extracted shape to known shape patterns;
  based on the comparing, determine the extracted shape does not satisfy a pattern match threshold for the known shape patterns;
  based on determining the extracted shape does not satisfy the pattern match threshold for the known shape patterns:
    determine an entity associated with the extracted shape based on the extracted shape, the determined entity having a type;
    analyze at least one of words or phrases of the conversation;
    based on the analyzing, determine at least one context for the conversation;
    based on the at least one context for the conversation and the determined entity, adjust the match pattern threshold for at least one of the known shape patterns;
    determine that the extracted shape satisfies the adjusted match pattern threshold for the at least one of the known shape patterns;
    based on determining that the extracted shape satisfies the adjusted match pattern threshold for the at least one of the known shape patterns, determining an annotation to convert the entity into; and convert the entity into the annotation, wherein the annotation is displayed based on the type.

2. The electronic device of claim 1, wherein the at least one context includes at least one of a time mentioned in the conversation, a place mentioned in the conversation, a person mentioned in the conversation, or a topic mentioned in the conversation.

3. The electronic device of claim 2, wherein the at least one context includes a destination location mentioned in the conversation and a current location of the electronic device, and wherein the annotation includes a message indicating an estimated time of arrival at the destination location.

4. The electronic device of claim 1, wherein the context comprises one or more of the following: a detected location of the electronic device, time taken to draw the received input, an active application, and data exposed by the active application.

5. The electronic device of claim 4, wherein the shape model includes a plurality of shape patterns associated with entity; and when a shape received by the shape model matches a shape pattern of the plurality of shape patterns, the annotation associated with the matched shape pattern is provided by the shape model.

6. The electronic device of claim 4, wherein the shape model includes a plurality of context element patterns associated with entity; and when at least one context element received by the shape model matches a context element pattern of the plurality of context element patterns, the annotation associated with the matched context element pattern is provided by the shape model.

7. The electronic device of claim 4, wherein the shape model is adjusted, based on feedback, according to machine learning.

8. The electronic device of claim 7, wherein the feedback includes at least one of user feedback, context elements, ink data, or shape data.

9. A method comprising:

receiving input from a user associated with a conversation;

extracting a shape from the received input;

comparing the extracted shape to known shape patterns;

based on the comparing, determining the extracted shape does not satisfy a pattern match threshold for the known shape patterns;

based on determining the extracted shape does not satisfy the pattern match threshold for the known shape patterns:

determining an entity associated with the extracted shape based on the extracted shape, the determined entity having a type;

analyzing at least one of words or phrases of the conversation;

based on the analyzing, determining at least one context for the conversation;

based on the at least one context for the conversation and the determined entity, adjusting the match pattern threshold for at least one of the known shape patterns;

determining that the extracted shape satisfies the adjusted match pattern threshold for the at least one of the known shape patterns;

based on determining that the extracted shape satisfies the adjusted match pattern threshold for the at least one of the known shape patterns, determining an annotation to convert the entity into; and converting, by an annotation engine, the entity into the annotation.

10. The method of claim 9, wherein the at least one context includes a topic mentioned in the conversation.

11. The method of claim 9, wherein the at least one context includes a timestamp, an application identifier, a location, or a calendar event.

12. The method of claim 9, wherein the type includes at least one of a list, an event, a location, or an expression.

13. The method of claim 9, further comprising rendering, by an annotation engine, the entity to the user based on the type by displaying the annotation on a screen to the user.

14. The method of claim 9, wherein determining the entity includes receiving, by a shape model, the extracted shape as input; and providing, by the shape model, the annotation as output.

15. The method of claim 14, wherein the shape model includes a plurality of shape patterns associated with the entity; and when the extracted shape received by the shape model matches the at least one of the known shape patterns, the annotation associated with the at least one of the known shape patterns is provided by the shape model.

16. The method of claim 14, wherein determining the entity includes receiving, by the shape model, at least one context element as input;

wherein the shape model includes a plurality of context element patterns associated with entity; and when the at least one context received by the shape model matches the at least one of the known shape patterns, the annotation associated with the at least one of the known shape patterns is provided by the shape model.

17. One or more computer storage media having computer-executable instructions that, upon execution by a processor, cause the processor to at least:

receive input from a user associated with a conversation;

extract a shape from the received input;

compare the extracted shape to known shape patterns;

based on the comparing, determine the extracted shape does not satisfy a pattern match threshold for the known shape patterns;

based on determining the extracted shape does not satisfy the pattern match threshold for the known shape patterns:

determine an entity associated with the extracted shape, the determined entity having a type;

analyze at least one of words or phrases of the conversation;

based on the analyzing, determine at least one context for the conversation;

based on the at least one context for the conversation and the determined entity, adjust the match pattern threshold for at least one of the known shape patterns;

determine that the extracted shape satisfies the adjusted match pattern threshold for the at least one of the known shape patterns;

based on determining that the extracted shape satisfies the adjusted match pattern threshold for the at least one known shape patterns, determining an annotation to convert the entity into; and convert the entity into the annotation.

18. The one or more computer storage media of claim 17, wherein determining the entity includes receiving the extracted shape and the at least one context as input; and providing the annotation associated with the extracted shape and the at least one context as output.

19. The one or more computer storage media of claim 17, wherein the at least one context element comprises two or more of the following: at least one of a time mentioned in the conversation, a place mentioned in the conversation, a person mentioned in the conversation, and a topic mentioned in the conversation.

20. The one or more computer storage media of claim 19, wherein the adjusting improves a likelihood of a match between the extracted shape and the at least one of the known shape patterns.

* * * * *